Patented Aug. 22, 1939

2,170,658

UNITED STATES PATENT OFFICE 2,170,658

ENAMEL COMPOSITION

Robert Tyler Hucks, South River, N. J., assignor to E. I. du Pont de Nemours & Company, Wilmington, Del., a corporation of Delaware No Drawing. Application August 31, 1934, Serial No. 742,281

7 Claims. (Cl. 260—16)

This invention relates to improved lacquer and enamel compositions containing certain synthetic resins and more particularly to such improved compositions which can be applied directly to metal for decorative and protective purposes.

In the finishing of metal articles with many paint or lacquer products, it is necessary to apply a so-called priming coat directly to the metal before the final, or decorative coat. This priming coat is used to obtain the necessary adhesion of the entire finish to the metal surface, and is formulated chiefly to obtain adhesion, and is not decorative in nature.

It is usually not possible to formulate the decorative coating which will have the desired decorative effects of shade or color and gloss, and the necessary film qualities of toughness, hardness and durability, and still possess adequate adhesion to unprimed metal surfaces. Since the decorative effect, and the toughness, hardness and durability are of paramount importance, and the adhesion can be obtained by the use of a priming coat, the quality of adhesion to bare metal in the decorative coat can be sacrificed and the essential adhesion obtained by the use of priming coats.

The application of priming compositions to secure satisfactory adhesion of the decorative compositions adds to the cost although it produces the most satisfactory result. For some uses, however, it is desired to eliminate this additional cost and still produce a reasonably satisfactory result so far as adhesion of the decorative composition to the metal being decorated is concerned. The present invention provides a means for accomplishing such a result.

This invention has as an object the provision of a composition to be used for decorative purposes on metal which will possess satisfactory adhesion when applied directly to metal without any previous priming compositions having been applied to the surface to be decorated. A further object is the provision of a composition for decorative purposes on metal which possesses the necessary film qualities of hardness, toughness, general durability and gloss together with the essential quality of permanent adhesion to unprimed metal surfaces.

These objects are accomplished in the present invention by incorporating into the decorative paint, lacquer or enamel product a relatively small quantity of orthophosphoric acid.

It has been found that, in applying a certain lacquer or enamel which possesses the necessary and desirable film qualities of hardness, toughness, general durability and gloss to metal surfaces in an atmosphere of relatively high humidity, unsatisfactory adhesion is obtained of the film to the metal. This, of course, is unsatisfactory from the standpoint of quality of the finished product. It is not usually practical to control the humidity conditions when applying such decorative coatings, particularly from an economic standpoint. It is, therefore, highly desirable to have a composition which will satisfactorily adhere to the metal surface to which it is applied and retain all the other desirable properties mentioned without having to resort to the extra cost of controlling the humidity conditions of the atmosphere or applying priming compositions to which the decorative composition is later applied. It has been found that the incorporation of a small percentage of orthophosphoric acid directly into the lacquer or enamel composition results in a product which gives the necessary adhesion of the resulting film to the metal when applied directly to the metal surface. One embodiment of the invention therefore consists in the incorporation of a small percentage of orthophosphoric acid directly into the film forming composition.

By way of illustrating the invention the following examples of representative compositions are given:

Example I

Green enamel containing alkyd resin and nitrocellulose.

| | Per cent |
|---|---|
| Nitrocellulose | 5.00 |
| *Synthetic resin | 22.00 |
| Dammar resin | 3.00 |
| Dibutyl phthalate | 1.00 |
| Lead chromate green | 7.00 |
| Orthophosphoric acid (85%) | .30 |
| Active solvent | 29.00 |
| Diluents | 32.70 |
| | 100.00 |

Example II

White enamel containing alkyd resin and nitrocellulose.

| | Per cent |
|---|---|
| Nitrocellulose | 5.00 |
| *Synthetic resin | 25.00 |
| Dibutyl phthalate | 1.00 |
| Titanium dioxide | 13.00 |
| Orthophosphoric acid (85%) | .30 |
| Active solvent | 29.00 |
| Diluents | 26.70 |
| | 100.00 |

Example III

White enamel containing alkyd resin without nitrocellulose.

|  | Per cent |
|---|---|
| *Synthetic resin | 30.0 |
| Dibutyl phthalate | 1.0 |
| Titanium dioxide | 15.0 |
| Orthophosphoric acid (85%) | .5 |
| "Hi-Flash" naphtha | 17.8 |
| Mineral spirits (boiling range 150–215° C.) | 35.7 |
|  | 100.00 |

* The synthetic resin mentioned in the examples is a condensation product of a polyhydric alcohol and a polybasic acid modified by drying oils or drying oil acids. The particular synthetic resin used in the above examples was the reaction product of:

|  | Parts |
|---|---|
| Glycerine | 20 |
| Perilla oil | 33 |
| Phthalic anhydride | 47 |

The nitrocellulose in the above examples has a viscosity of about 2 or 3 seconds although ½ to 80 seconds nitrocellulose, as determined by the A. S. T. M. Tentative Specifications D–301–31T, formula A, may be used, depending on the method of application of the finished composition.

In preparing the alkyd condensation product the oil and glycerine are placed in a suitable kettle and the charge heated to 460–470° F. This temperature is maintained with stirring of the contents of the kettle until the mixture remains clear on glass and is soluble in alcohol in all proportions. The phthalic anhydride is then added and the temperature of the mixture maintained at 425° F. for from 3 to 3½ hours.

The alkyd condensation product can also be prepared by the well known method of placing all the ingredients in a kettle at once and heating to a suitable temperature, depending on the particular oil or components selected. The details of operation will be apparent to those skilled in the art.

The enamels of the examples given above are prepared by practices well established in the art. The pigments are dispersed by means of ball mills, roller mills or other suitable means, generally in solutions of the resin or part of the total pyroxylin content, or combinations of these. The cellulose ester derivative is dispersed in the solvent and the combined ingredients mixed by usual well known practices.

The orthophosphoric acid may be added directly to the lacquer or enamel composition if desired but the preferred procedure is to introduce it through the so-called thinner or diluent with which the lacquer or enamel is usually mixed before being applied to the surface to be decorated. An example of such a thinner or diluent is the following:

Example IV

|  | Parts |
|---|---|
| Butyl acetate | 20.0 |
| Ethyl acetate | 10.0 |
| Denatured alcohol | 8.0 |
| Butyl alcohol | 12.0 |
| Toluene | 11.3 |
| Xylene | 5.0 |
| Solvent naphtha | 33.0 |
| Orthophosphoric acid (85%) | .1 to 1.0 |

The orthophosphoric acid used is the technical grade so-called "sirupy phosphoric acid". The preferred amounts for use based on the entire formulation as noted in the examples is between 0.05 and 1.0%. Amounts less than 0.05% do not produce the desired result of satisfactory adhesion and amounts greater than 1.0% are rarely necessary and may cause undesirable changes in the compositions themselves either with respect to color in certain cases or consistency of the composition. As previously noted the phosphoric acid may be added to the composition directly or may be introduced through the thinner. This invention is particularly adaptable and effective to lacquer and enamel compositions containing alkyd resin condensation products. The examples given above are merely by way of illustration and are not intended to be construed as a limitation of compositions in which the phosphoric acid is or can be used.

While I have mentioned Perilla oil as the modifying agent in the examples I am not limited thereto, but may substitute in whole or part by other oils such as China-wood, soy bean, or linseed, or the corresponding oil acids. I may also replace the phthalic acid by other polybasic acids such as succinic, adipic, fumaric, maleic, sebacic, and the like. Other polyhydric alcohols may be used in place of the glycerine, for example glycol or diethylene glycol, as will be evident to those skilled in making resins.

In the claims the term "plasticizer" is used in a broad sense and is intended to include softeners, solvent softeners, and other similarly acting classes of compounds which are added to the composition to prevent it from becoming brittle and checked.

The product of the invention has found extensive commercial use in the general industrial decorative finishing field. It has been used with success in finishing steel cabinets, metal novelties, metal partitions, typewriters, business machines, heavy machinery, washing machines, etc.

The principal advantage of the product of the invention is that it adheres satisfactorily to metal to which it is directly applied without the previous application of so-called priming compositions. Another advantage is that the compositions containing the relatively small quantity of phosphoric acid can be applied directly to metal without preliminary priming coats even in atmospheres of relatively high humidity and still possess satisfactory adhesion to the metal. This is not possible with materials of the prior art without sacrificing some of the other necessary and desirable properties such as hardness, toughness, general durability and gloss of the finished coating, unless the metal is specially cleaned or other special procedures are resorted to.

It is apparent that many widely different embodiments of this invention may be made without departing from the spirit and scope thereof and, therefore, it is not intended to be limited except as indicated in the appended claims.

I claim:

1. A protective and decorative coating composition comprising a polyhydric alcohol-polybasic acid resin containing the acid radical of an oil having drying properties, a natural resin, cellulose nitrate, a plasticizer, pigment and orthophosphoric acid in the amount of approximately 0.05–1.00% said resins forming the predominant film forming component.

2. A protective and decorative coating composition comprising a polyhydric alcohol-polybasic acid resin, a plasticizer, pigment and orthophosphoric acid, said resin forming the predominant film forming component.

3. A protective and decorative coating composition comprising a polyhydric alcohol-polybasic acid resin containing the acid radical of an oil having drying properties, a plasticizer, pigment and orthophosphoric acid in the amount of approximately 0.05-1.00%, said resin forming the predominant film forming component.

4. An enamel composition containing nitrocellulose, drying oil modified alkyd resin, dibutyl phthalate, pigment, solvent and about .30% orthophosphoric acid, said resin forming the predominant film forming component.

5. Product of claim 4 in which the drying oil is Perilla oil.

6. An enamel composition containing a resin as the major film forming component, a cellulose derivative, a softener, and from 0.05 to 1.00% orthophosphoric acid.

7. A thinner for preparing enamels and the like consisting of at least one solvent and from 0.05 to 1.00% orthophosphoric acid.

ROBERT TYLER HUCKS.